United States Patent
Pestke et al.

(10) Patent No.: US 11,752,831 B2
(45) Date of Patent: Sep. 12, 2023

(54) OPERATING ELEMENT FOR AN AIR VENT OF A VEHICLE AND AIR VENT WITH A CORRESPONDING OPERATING ELEMENT

(71) Applicant: ILLINOIS TOOL WORKS INC., Glenview, IL (US)

(72) Inventors: Joachim Pestke, Enkenbach-Alsenbom (DE); Günther Krämer, Enkenbach-Alsenbom (DE); Sabine Steinbeiss, Selb (DE); Marek Prodělal, Jicin (CZ); Thomas Pacher, Sembach (DE); Manfred Groben, Gau-Bickelheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 17 days.

(21) Appl. No.: 17/532,221

(22) Filed: Nov. 22, 2021

(65) Prior Publication Data
US 2022/0161628 A1 May 26, 2022

(30) Foreign Application Priority Data

Nov. 23, 2020 (DE) .................. 10 2020 130 934.1
May 28, 2021 (DE) .................. 10 2021 113 912.0

(51) Int. Cl.
*B60H 1/00* (2006.01)
*B60H 1/34* (2006.01)

(52) U.S. Cl.
CPC ......... *B60H 1/0065* (2013.01); *B60H 1/3421* (2013.01); *B60H 2001/3471* (2013.01)

(58) Field of Classification Search
CPC ................ B60H 1/0065; B60H 1/3421; B60H 2001/3471
See application file for complete search history.

(56) References Cited

U.S. PATENT DOCUMENTS

2005/0097704 A1* 5/2005 Song .................... B60H 1/3414
16/110.1
2006/0014485 A1 1/2006 Sousa
(Continued)

FOREIGN PATENT DOCUMENTS

DE          10104428 C2    8/2002
DE          60016116 T2   11/2005
(Continued)

*Primary Examiner* — Edelmira Bosques
*Assistant Examiner* — Michael James Giordano
(74) *Attorney, Agent, or Firm* — THOMPSON HINE LLP

(57) ABSTRACT

An operator element for an air vent of a vehicle, wherein the operator element is slidably or rotatably mounted relative to a carrier element, and wherein the operator element is associated with a friction brake having an elastically deformable friction body, which elastically springingly pushes against the operator element and/or the carrier element, such that the friction brake moves the operator element relative to the carrier via friction. The friction body is aligned at least in regions in the longitudinal direction of the movement path of the operator element and has at least in regions a cross-section with an at least substantially star-shaped, in particular X-shaped or Y-shaped, cross-sectional surface or a polygonal cross-sectional surface having at least three corners or a cross-sectional surface having circumferentially distributed tooth regions.

16 Claims, 5 Drawing Sheets

(56) References Cited

U.S. PATENT DOCUMENTS

| | | | |
|---|---|---|---|
| 2007/0111653 A1 | 5/2007 | Endou | |
| 2009/0286462 A1* | 11/2009 | Goto | B60H 1/3428 |
| | | | 454/155 |
| 2014/0120826 A1* | 5/2014 | Takai | F24F 13/1426 |
| | | | 454/325 |
| 2016/0229259 A1* | 8/2016 | Kwon | B60H 1/3414 |
| 2017/0259649 A1* | 9/2017 | Shibata | B60H 1/3421 |
| 2018/0022180 A1* | 1/2018 | Lin | B60H 1/3421 |
| | | | 454/155 |

FOREIGN PATENT DOCUMENTS

| | | |
|---|---|---|
| DE | 102010032231 A1 | 1/2012 |
| DE | 112016005468 T5 | 8/2018 |
| DE | 102020204369 A1 | 10/2020 |
| EP | 3109079 A1 | 12/2016 |
| JP | H04288442 A | 10/1992 |
| WO | WO1998029272 A1 | 7/1998 |

\* cited by examiner

OPERATING ELEMENT FOR AN AIR VENT OF A VEHICLE AND AIR VENT WITH A CORRESPONDING OPERATING ELEMENT

TECHNICAL FIELD

The invention relates generally to an operator element and an assembly for an air vent in a vehicle. The invention further relates to a method for assembling such an operator element, in particular on a slat of an air vent.

BACKGROUND

Vehicle air vents (aka air diffusers) typically have at least one operator element in order to control the direction and/or strength of the emitted air flow. For example, the operator element is slidably mounted with a receptacle on a pivotable slat, which can deflect the air flow. In order to enable a simple sliding of the operator element on the slat, on the one hand, but also to enable a low-noise mounting of the operator element on the slat, on the other hand, additional components, for example additional spring elements, are provided between the operator element and the slat, via which a play-free mounting of the operator element on the slat is produced.

The term "operator element" as used herein generally refers to a device for operating, adjusting, setting, etc. Electrical values are settable, for example with a potentiometer that is settable via the operator element, or components are mechanically moved, in particular manually.

The term "operator element" includes setting wheels and/or setting sliders having mechanical and/or electrical control functions, wherein the operator elements are in particular operable by hand and protrude from a front plate with an actuating element or a partial circular portion in order to be actuated, in particular manually. In the case of electrical embodiments, one can consider switches, sliding resistors, and rotational potentiometers, in particular, and in the case of mechanical embodiments, one can consider, for example, setting wheels or setting wheel segments or also longitudinal sliders in air nozzles like the ones installed in vehicles in order to supply fresh air or warm air to the cabin. Such air vents have pivotable horizontal and/or vertical slats in the mounting case or in a frame connected thereto, which slats are adjustable in their inclination angle, whereby either an air flow through the air vent can penetrate outwardly or, in the closed state, such an air flow is interrupted. Each intermediate position can also be taken.

In order to apply a continuous rotational or sliding torque, springs are provided for such operator elements, which springs are clamped between the sliding part and the carrier element and passed along a sliding surface on the carrier element. The compressive forces that occur in doing so are of the dimension such that only a braking effect is achieved while sliding.

It has been shown that such operator elements having a spring can produce noise while sliding. Further, it has been shown that the relatively hard spring can only be inserted with difficulty when mounted with its ends in corresponding receptacles in order to ensure the desired braking effect while sliding.

The engaged springs work here as grinding brakes and optionally also as latches, for which purpose they can snap into latch recesses in the final positions or also in center positions and slide out of them again by increased application of force. A desired slight actuation is insufficient for such grinding brakes. Furthermore, it has been shown that the springs are relatively large, so that such spring-loaded braking elements can only be introduced into larger components. Furthermore, assembly is extremely complex.

For example, such an operator element of an air vent having an additional spring element is known from the publication DE 101 04 428 C2, the publication DE 600 16 116 T2, and the publication US 2006/0014485 A1.

When mounting these known operator elements, there is also a fundamental risk that the additional components (spring elements) will be damaged or lost. Additional spring elements can be lost, for example, during transport or assembly due to their small size. In addition, the spring element can be displaced during assembly so that it is not correctly positioned and cannot perform the desired function.

SUMMARY

Based on this situation, the underlying problem addressed by the present invention is to specify an operator element, which, on the one hand, has a simple construction so that the manufacturing and assembly effort is reduced. On the other hand, a reliable function of the operator element is to be ensured, wherein in particular a silent or low-noise actuation of the operator element can be implemented without further effort.

This problem is solved according to the invention by the subject matter of independent claim 1, wherein advantageous further developments of the operator element according to the invention are specified in the dependent claims 2 to 11.

Accordingly, the invention relates in particular to an operator element for an air vent of a vehicle, wherein the operator element is slidably or rotatably mounted relative to a carrier element, and wherein the operator element is associated with a friction brake having an elastically deformable friction body, which elastically springingly pushes against the operator element and/or against the carrier element, such that the friction brake slows a movement of the operator element relative to the carrier element via friction.

The friction brake with the elastically deformable friction body is arranged spatially between the operator element and the carrier element or a guide of the operator element. Here, the friction brake with the elastically deformable friction body can either be arranged on the operator element and move with the operator element, or it can be arranged on the carrier element or the guide, that is to say, fixed in relation to the guide or to the carrier element, or it can be arranged without a defined association, that is to say, without a direct or indirect stationary connection to one of the components operator element or carrier element/guide, wherein the latter case is referred to as a "floating" mounting.

The elastically deformable friction body of the friction brake is in particular made of a plastic and pushes elastically springingly directly or indirectly against the guide or the carrier element and against the operator element. The friction brake thereby causes a frictional force between the operator element and the carrier element or the guide of the carrier element, and thus slows the operator element via friction, so that the operator element does not move on its own but must, for example, be moved by hand in order to overcome the friction.

According to the present invention, the friction body of the friction brake is aligned or configured at least in regions in alignment with or in the longitudinal direction of the movement path of the operator element and has at least in regions a cross-section with an at least substantially star-shaped, such as X-shaped or Y-shaped cross-sectional surface, or a polygonal cross-sectional surface having at least three corners or a cross-sectional surface having tooth regions distributed over a circumference of a base body of the friction body.

This particular configuration of the friction brake has significant advantages. Due to the particular cross-sectional geometry of the friction body, in particular a cross-sectional geometry in which—when viewed in cross-section—tooth regions are provided distributed over a circumference of a base body of the friction body, an outer contour of the friction body is given, in which, in an installed state, only the tooth regions of the friction body cause the frictional force between the operator element and the carrier element, which ultimately ensures an elastic yielding of the tooth regions of the friction body. In this way, component tolerances can be compensated by deformation of the friction body.

Due to the design of the friction body according to the invention with the special cross-sectional geometry, a so-called stick-slip effect can also be avoided without lubricant, a temperature dependency can be kept low, and wear can also be kept low without lubrication. The stick-slip effect is referred to as the Haftgleiteffekt in German and means a jerking motion that is normally undesirable. A uniform motion is desired.

Preferably, the friction body is configured rotationally symmetrically to the longitudinal axis of the friction body, so that an installation of the friction body is simplified, because the alignment of the friction body with respect to its longitudinal axis need not be considered during installation.

In particular, the friction body is elongated, meaning that it has a length that is at least as large, and in particular at least 1.5 times as large, as its diameter. This results in a large abutment surface of the friction body or the tooth regions of the friction body at a low installation height.

According to preferred implementations, the cross-sectional surface of the friction body at least substantially corresponds to the cross-sectional surface of a regular polygon. In geometry, a regular polygon is a planar polygon that is both equilateral and equiangular. In a regular polygon, therefore, all sides have the same length and all inner angles have the same size. The corners of a regular polygon all lie on a common virtual or real circle, wherein adjacent corners [having] the same center point angle appear. Here, the corners of the regular polygon form the tooth regions of the friction body.

This configuration of the friction body simplifies the installation of the friction body, because the alignment of the friction body with respect to its longitudinal axis need not be considered during installation.

Preferably, the elastically deformable friction body of the friction brake is comprised of an elastomer, and in particular a thermoplastic elastomer (TPE), styrene-butadiene rubber (SBR), nitrile butadiene rubber (NBR), chloroprene rubber (CR), fluoropolymer rubber (FKM), butadiene rubber (BR), ethylene propylene diene monomer rubber (EPDM), and/or silicone. These materials have proven to be particularly advantageous for use as the friction body. Of course, however, other materials are also generally conceivable.

The operator element according to the invention is in particular characterized in that it can manage with a small number of components, which allows for a much faster and simpler assembly of the operator element. Due to the special cross-sectional geometry of the friction body of the friction brake, the exact positioning and alignment of the friction body, among other things, need not be considered when assembling the operator element. In particular, this occurs automatically when the operator element is correctly mounted.

In order to simplify the manufacture and later assembly of the operator element, a bracket is associated with the friction body, for example, which bracket is arranged on the carrier element (or, alternatively, on the operator element). The friction body is fixed or fixable via the bracket to the carrier element or, alternatively, to the operator element.

It is conceivable in this context that the bracket has a window region into which the friction body can be inserted, and in particular slid, in the longitudinal direction of the movement path of the operator element.

According to preferred implementations of the bracket, the latter preferably has two opposite and unilaterally free-standing arm regions, between which the friction body is received or receivable, preferably interchangeably.

In this context, it is conceivable in particular that the preferably two arm regions of the bracket form a snap connection for the particularly releasable joining of the friction body, wherein at least one of the preferably two arm regions is configured as an elastically deformable joining part. Of course, other designs for a snap connection are also possible.

In other words, the friction body is preferably in particular releasably connectable to the bracket and thus to the carrier element and/or the operator element via simple positive lock joining. In this way, significant savings in the assembly process are made possible.

According to embodiments of the most recently mentioned configurations, the preferably two arm regions of the bracket are preferably each designed as hook elements or preferably each have a hook region in order to form a preferably releasable positive lock with the friction body.

The special cross-sectional geometry of the friction body in particular simplifies the installation of the friction body and the assembly of the operator element. In particular, the special cross-sectional geometry of the friction body is suitable for the (automatic) compensation of component tolerances. In addition, there is an automatic exact positioning and alignment of the friction body relative to the carrier element and the operator element.

For this purpose, according to embodiments of the invention, it is provided that the bracket is associated with centering and/or positioning means, which are configured in order to cooperate with corresponding centering and/or positioning means of the friction body when the friction body is assembled in the bracket such that the friction body independently assumes a determined or determinable position and/or alignment relative to the carrier element or the operator element in the bracket.

The determined or determinable position and/or alignment of the friction body relative to the carrier element or the operator element in the bracket is selected in particular such that, when the friction body is mounted in the bracket, at least one protruding tooth region forms a frictional connection with a sliding surface of the operator element extending in the direction of movement of the operator element.

In this context, it is fundamentally conceivable that the frictional force between the at least one protruding region or the tooth region of the friction body and the sliding surface of the operator element is preferably adjustable, in particular via a positioning or alignment of the friction body relative to the sliding surface of the operator element and/or in particular via a suitable spacing of the sliding surface relative to the friction body. Of course, other solutions are possible here, as well.

In order to form the centering and/or positioning means associated with the bracket, it is provided according to embodiments of the operator element according to the invention that the centering and/or positioning means associated with the bracket have at least one region protruding in the direction of the friction body, in particular in the form of a rib structure extending in the longitudinal direction of the friction body, wherein the at least one protruding region is formed in order to engage at least in regions in a recess of the friction body, which is preferably formed to be complementary to the protruding region at least in regions, when the friction body is mounted.

As already stated, according to the design variants, it is possible for the friction body to have regions or tooth regions distributed and protruding over the circumference of a base body. In this context, it lends itself that a gap between two adjacent tooth regions of the friction body is configured in order to interact with the at least one region of the centering and/or positioning means associated with the bracket protruding towards the friction body when assembling the friction body.

Of course, other solutions for the automatic positioning and/or alignment of the friction body are also possible.

According to preferred embodiments of the operator element according to the invention, the friction body is fixedly connected or connectable to the carrier element. However, as stated at the outset, it is fundamentally conceivable that the friction body not be connected to the carrier element but rather to the operator element. Alternatively, a "floating" mounting of the friction body is also conceivable.

The invention further relates to a slat for an air vent of a vehicle, having an operator element of the aforementioned kind according to the invention and a guide for guiding the operator element during a movement relative to the slat. In this embodiment, the slat serves as a carrier element for the operator element, and the operator element is movable, in particular slidable, in relation to the guide relative to the slat. The friction body of the friction brake is preferably configured in order to extend in alignment with the slat at least in regions.

In this context, it is conceivable that the operator element has a sliding surface, which is frictionally connected to the friction body.

Regardless of the specific configuration of the slat, the operator element is preferably associated with at least one stop in order to ensure a coupling function between a horizontal and vertical slat as well as the functional capability of the air vent in each position by limiting a maximum possible displacement distance.

The invention further relates to an air vent for a vehicle, having a slat of the aforementioned kind according to the invention.

Further, the invention relates to an air vent for a vehicle, having an operator element of the aforementioned kind according to the invention, wherein the carrier element serves as a guide for a setting wheel or an operating roller, and the operator element is rotatably mounted on the guide.

BRIEF DESCRIPTION OF THE DRAWINGS

An exemplary embodiment of the operator element according to the invention is described in more detail in the following, with reference to the accompanying drawings.

The figures show.

DETAILED DESCRIPTION

Figure 1:
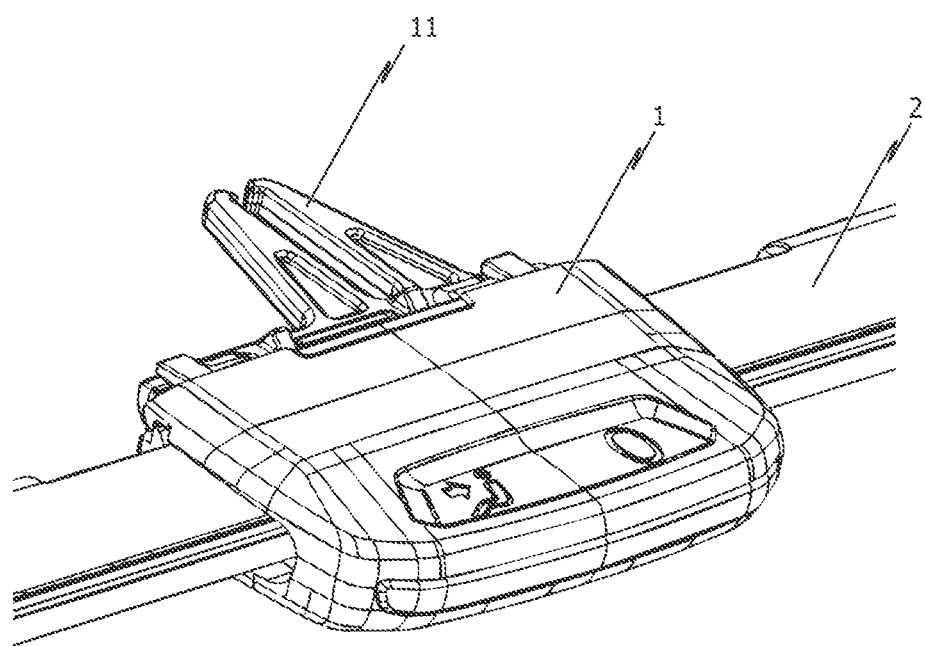
FIG. 1 schematically and in an isometric view, an exemplary embodiment of the operator element according to the invention, wherein the operator element is slidably arranged on a (horizontal) slat of an air vent.
Figure 2:
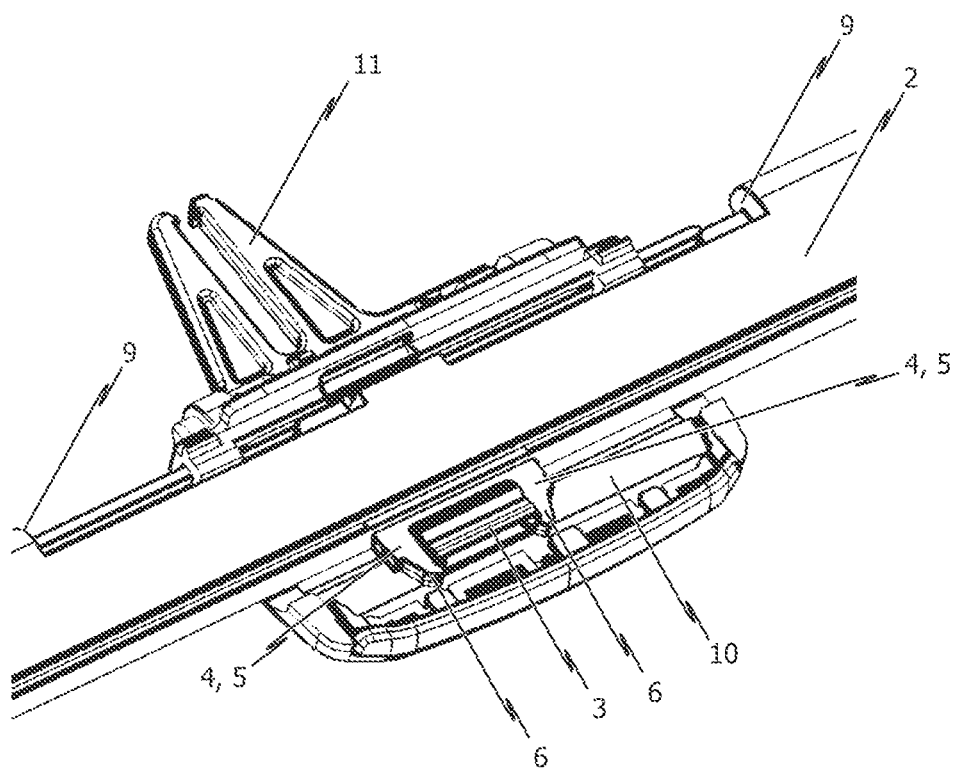
FIG. 2 schematically and in an isometric, partially cut view, the operator element according to FIG. 1.

FIG. 1 at least partially shows, schematically and in an isometric view, a slat 2 of a front slat block of an air vent, wherein an operator element 1 is arranged on the slat 2. The operator element 1 is connected to the slat 2. The operator element 1 can be moved to the left and to the right in the longitudinal direction of the slat 2, that is to say, when looking at the air outlet opening of the air vent case. At the same time, by a vertical movement of the operator element 1, the alignment of the slat 2 can be adjusted in a horizontal plane so that it deflects the air in a vertical direction. This movement of the slat 2 can also be carried out via a setting wheel arranged separately on the case of the air vent.

The operator element 1 can have a force transfer element on the rear, which can be fitted, for example, with an angled fork 11 onto a vertical slat (not shown in the drawings) in the case (not shown), such that a pivoting of the vertical slat can be caused by sliding the operator element 1 on the horizontal slat 2 shown in the drawings.

Although not shown in the drawings, a second slat block is generally arranged behind the horizontal slat 2. There, the slats are arranged offset by 90° from the slats 2 of the first front slat block. However, they can also be arranged at an angle that deviates from 90°.

The operator element 1 is configured in particular as a sliding element and has an operating interface, which is used by a user in order to simply push and actuate the operator element 1.

The operator element 1 is configured in particular to be longitudinally flat and to extend towards the slat 2. It thus achieves a slim line and does not appear chunky. The operator element 1 wraps around the slat 2 and at least partially encloses the slat 2 in the lower and upper regions.

Of course, it is also conceivable that the operator element 1 only wraps under or through the slat 2 and at least partially encloses the slat 2 only in the lower or in the upper region.

The operator element 1 is slidably mounted relative to the slat 2 in the longitudinal direction of the slat 2. Corresponding guide surfaces are provided for this purpose. The overall displacement path of the operator element 1 is limited by corresponding stops 9.

As shown in the drawings, a friction brake having an elastically deformable friction body 3 is associated with the operator element 1. In the assembled state, the elastically deformable friction body 3 pushes elastically springingly against the operator element 1 so that the friction brake slows a movement of the operator element 1 relative to the slat 2 via friction.

Alternatively, however, it is also conceivable that the elastically deformable friction body 3 of the friction brake is not connected to the slat 2 serving as the carrier element, but rather to the operator element 1 itself, wherein the elastically deformable friction body 3 then pushes elastically springingly against the slat 2 serving as the carrier element for the operator element 1 and slows a movement of the operator element 1 relative to the slat 2 via friction.

The friction body 3 is aligned at least in regions in the longitudinal direction of the movement path of the operator element 1. It has a cross-section at least in regions with an at least substantially star-shaped, in particular X-shaped or Y-shaped cross-sectional region, as can be seen in particular in the sectional view in FIG. 4.

Alternatively, however, it is also conceivable that the friction body 3 has at least in regions a cross-section with a polygonal cross-sectional surface having at least three corners.

Generally speaking, the friction body 3 has a cross-sectional surface with tooth regions 8 distributed over a circumference of a base body of the friction body 3.

One embodiment of this could be, for example, that the cross-sectional surface of the friction body 3 at least substantially corresponds to the cross-sectional surface of a regular polygon. A polygon is in particular a trigon, a tetragon, a pentagon, a hexagon, a heptagon, etc. Preferably, the cross-sectional surface of the friction body 3 at least substantially corresponds to the cross-sectional surface of a regular polygon having an even number of corners. Of course, other configurations can also be considered here.

The special cross-sectional geometry of the friction body 3 serves in particular simultaneously to compensate for any manufacturing tolerances. In particular, the friction body 3 does not have a preferred installation position, because, due to the star-shaped or polygonal cross-sectional geometry, it is always ensured that the region of the friction body 3 (that is to say, the at least one tooth region 8 of the friction body 3) comes into frictional contact with the operator element 1 and/or the carrier element 2. In this way, the overall assembly of the friction body 3 is substantially simplified.

In the configuration of the operator element 1 shown in the drawings, for the purpose of mounting the friction body 3 on the carrier element 2, it is provided that a bracket 4 is associated with the friction body 3, via which bracket the friction body 3 is fixed or fixable to the carrier element 2. Alternatively or in addition to the stops 9, the bracket 4 can also have the function of limiting the overall displacement path of the operator element 1. This offers advantages, in particular, when there is stress due to misuse.

In the embodiment shown in the drawings, the bracket 4 is connected to the carrier element 2 (that is to say, to the slat 2). Of course, however, a configuration in which the bracket 4 is connected to the operator element 1 is also conceivable.

Figure 3:
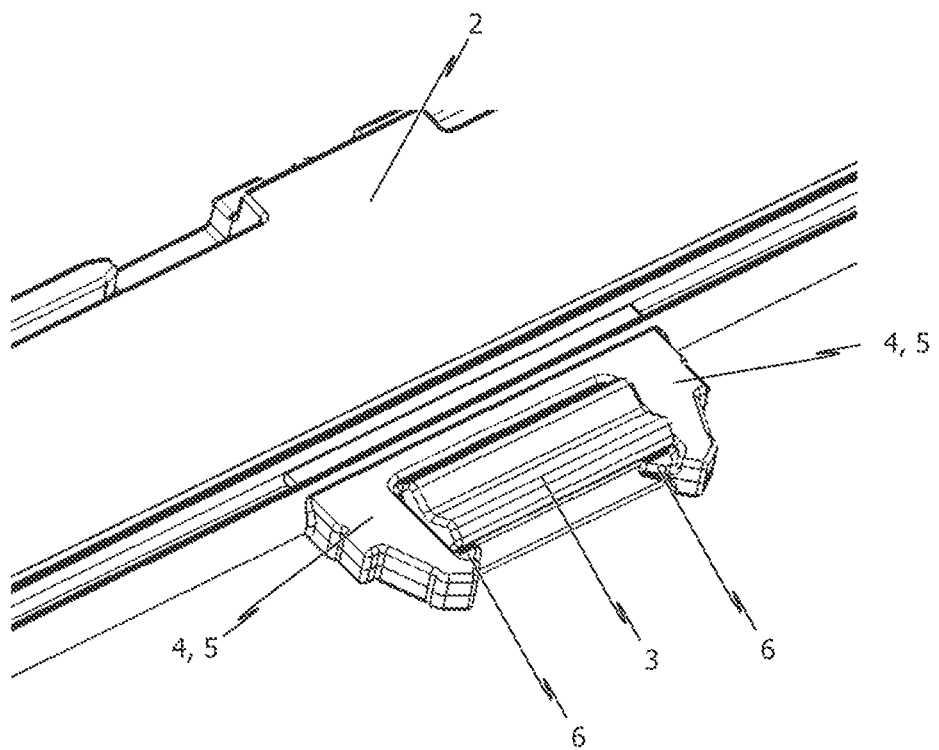
FIG. 3 schematically and in an isometric view, a region of the slat according to FIG. 1 with a friction body of the friction brake associated with operator element, said friction body being mounted on the slat.

As can be seen in particular in the illustration of FIG. 3, in the embodiment shown in the drawings, the bracket 4 has two opposing and unilaterally free-standing arm regions 5, between which the friction body 3 is interchangeably received.

In the embodiment shown in the drawings, the two arm regions 5 of the bracket 4 are configured as hook elements 6 and serve to form a releasable positive lock with the friction body 3.

Figure 4:
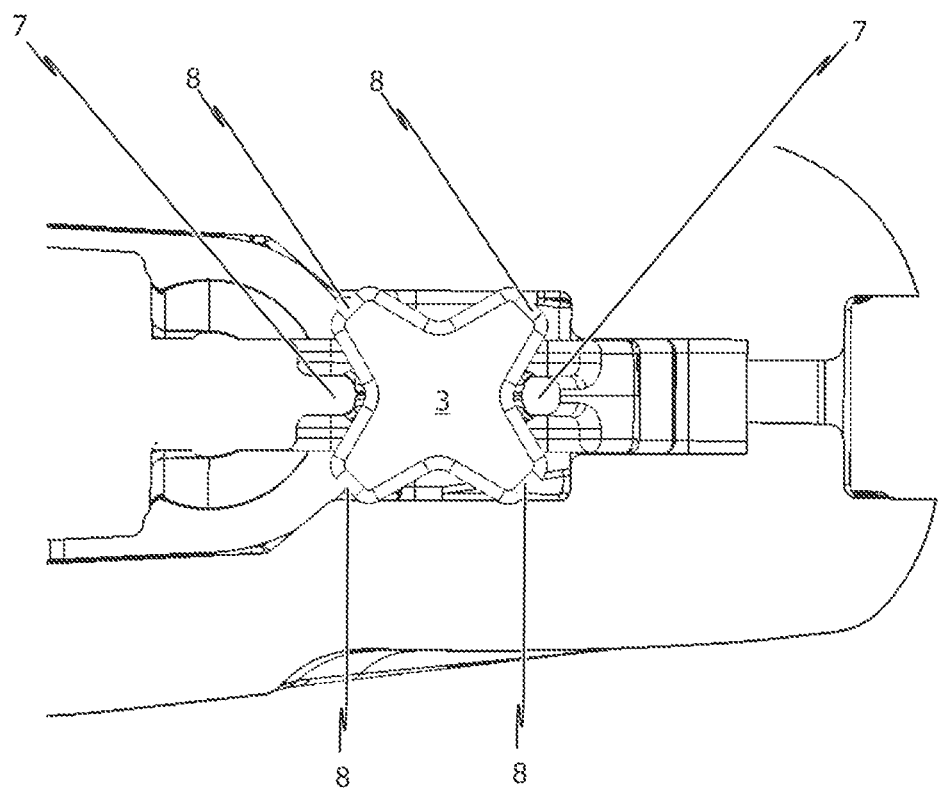
FIG. 4 schematically and in a cross-sectional view, the exemplary embodiment of the operator element according to the invention with the friction brake associated with the operator element.
Figure 5:
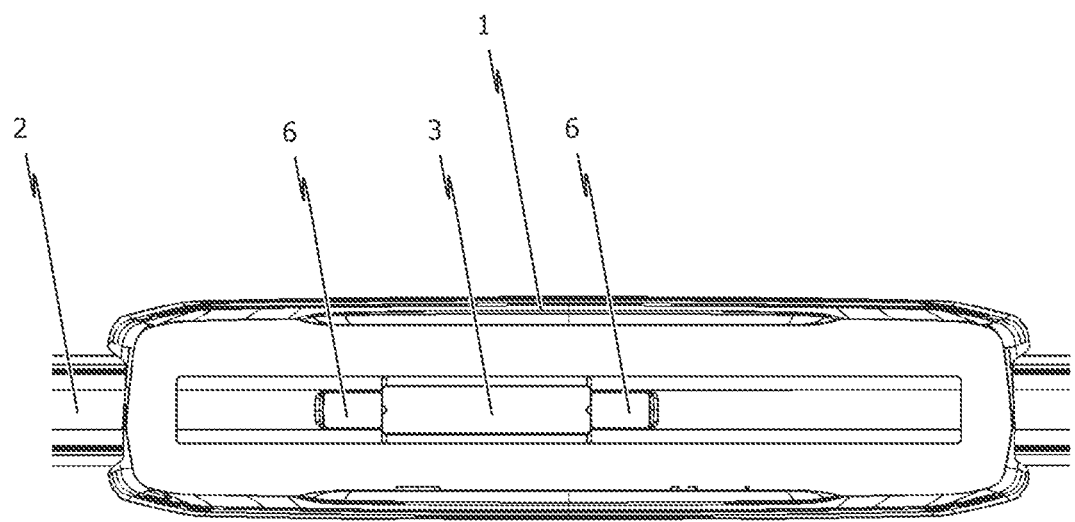
FIG. 5 schematically and in a partially cut view, a frontal view of the exemplary embodiment of the air vent according to FIG. 1.

From the sectional view according to FIG. 4, it can be seen that the bracket 4 is associated with centering and/or positioning means 7, which are configured in order to cooperate with corresponding centering and/or positioning means of the friction body 3 when the friction body 3 is assembled in the bracket 4 such that the friction body 3 independently assumes a determined or determinable position and/or alignment relative to the slat 2 serving as the carrier element 2 or relative to the operator element 1 in the bracket 4.

The determined or determinable position and/or alignment of the friction body 3 is selected in particular such that, when the friction body 3 is mounted in the bracket 4, at least one protruding region or tooth region 8 of the friction body 3 forms a frictional connection with a sliding surface 10 extending in the direction of movement of the operator element 1. In this regard, reference is made to the sectional view in FIG. 4.

It can also be seen from the illustration in FIG. 4 that the centering and/or positioning means 7 associated with the bracket 4 have at least one region protruding in the direction of the friction body 3, in particular in the form of a rib structure extending in the longitudinal direction of the friction body 3, wherein the at least one protruding region is formed in order to engage at least in regions in a recess of the friction body 3, which is preferably formed to be complementary to the protruding region at least in regions, when the friction body 3 is mounted.

The centering/positioning means 7 fix the friction body 3 in the recess between the tooth regions 8 of the friction body 3 in particular in such a way that they allow the tooth regions 8 of the friction body 3 to move largely freely when clamping between the sliding surfaces 10.

Due to the particularly X-shaped geometrical design of the friction body 3, a lower geometrical stiffness is employed in order to achieve a soft configuration of the system and thus a flat spring characteristic along with the low stiffness of the material. A flat spring characteristic is essential for a good tolerance compensation of the system and thus for achieving equal forces over all possible tolerance combinations to the extent possible.

Only two components are involved in the tolerance chain that is relevant for the forces of movement: the friction element 3 and the operator element 1 with its two opposing sliding surfaces 10. The force of movement is thus only dependent on the following three values: the distance between the sliding surfaces 10, the height of the friction element 3, and the coefficient of friction. This extremely short tolerance chain is a major advantage of the system.

The invention is not limited to the embodiments shown in the drawings, but rather results when all of the features disclosed herein are considered together.

LIST OF REFERENCE NUMERALS

1 Operator element
2 Carrier element/Horizontal slat
3 Friction body
4 Bracket
5 Arm region of the bracket
6 Hook element/hook region
7 Centering/positioning means of the bracket/rib structure
8 Tooth region of the friction body
9 Stop
10 Sliding surface
11 Fork

The invention claimed is:

1. An operator element for an air vent of a vehicle, wherein the operator element is slidably or rotatably mounted relative to a carrier element, and wherein the operator element is associated with a friction brake having an elastically deformable friction body, which elastically springingly pushes against the operator element and/or the carrier element, such that the friction brake moves the operator element relative to the carrier via friction,
wherein
the friction body is aligned at least in regions in the longitudinal direction of the movement path of the operator element and has at least in regions a cross-section with an at least substantially star-shaped cross-sectional surface or a cross-sectional surface having circumferentially distributed tooth regions.

2. The operator element according to claim 1,
wherein the friction body is formed from at least one of a thermoplastic elastomer (TPE), styrene-butadiene rubber (SBR), nitrile butadiene rubber (NBR), chloroprene rubber (CR), flouropolymer rubber (FKM), butadiene rubber (BR), ethylene propylene diene monomer rubber (EPDM), and/or silicone.

3. The operator element according to claim 1,
wherein a bracket is associated with the friction body, wherein the friction body is fixed or fixable to the carrier element via the bracket, wherein the bracket has two opposing and unilaterally free-standing arm regions, between which the friction body is interchangeably received or receivable, or wherein the bracket has a window region into which the friction body can be inserted by sliding in the longitudinal direction of the movement path of the operator element.

4. The operator element according to claim 3,
wherein the two arm regions of the bracket form a snap connection for releasable joining of the friction body.

5. The operator element according to claim 4,
wherein the two arm regions are respectively configured as hook elements or each have a hook region for releasably forming a positive lock with the friction body.

6. The operator element according to claim 1,
wherein a bracket is associated with the friction body, wherein the bracket is associated with centering and/or positioning means, which are configured in order to cooperate with corresponding centering and/or positioning means of the friction body when the friction body is assembled in the bracket such that the friction body independently assumes a determined or determinable position and/or alignment relative to the bracket.

7. The operator element according to claim 6,
wherein the previously determined or determinable position and/or alignment of the friction body is selected such that, when the friction body is mounted in the bracket, at least one protruding region or tooth region of the friction body forms a frictional connection with a sliding surface extending in the direction of movement of the operator element, wherein the frictional force between the at least one protruding region or tooth region of the friction body and the sliding surface of the operator element is adjustable via a positioning or alignment of the friction body relative to the bracket and/or relative to the operator element and/or via a suitable spacing of the sliding surface relative to the friction body.

8. The operator element according to claim 6,
wherein the centering and/or positioning means associated with the bracket have at least one region protruding in the direction of the friction body in the form of a rib structure extending in the longitudinal direction of the friction body, wherein the at least one protruding region is formed in order to engage at least in regions in a recess of the friction body, which is formed to be complementary to the protruding region at least in regions, when the friction body is mounted.

9. The operator element according to claim 8,
wherein the friction body has regions or tooth regions that are evenly distributed around its circumference and extend in the longitudinal direction of the friction body, wherein a gap is formed between two adjacent tooth regions in order to interact with the at least one region of the centering and/or positioning means associated with the bracket protruding towards the friction body when assembling the friction body, namely such that the centering and/or positioning means associated with the bracket allow the tooth regions of the friction body to move at least largely freely when clamping between the sliding surfaces of the operator element.

10. The operator element according to claim 1,
wherein the friction body is fixedly connected or connectable to the carrier element.

11. A slat for an air vent of a vehicle, having an operator element according to claim 1 and a guide, wherein the slat serves as a carrier element for the operator element and the operator element is slidable, in relation to the guide relative to the slat, wherein the friction body is aligned at least in regions in the longitudinal direction of the movement path of the operator element and has at least in regions a cross-section with an at least substantially star-shaped cross-sectional surface or a polygonal cross-sectional surface having at least three corners or a cross-sectional surface having circumferentially distributed tooth regions.

12. The slat according to claim 11,
wherein the operator element has a sliding surface, which is frictionally connected to the friction body; and/or
wherein at least one stop is associated with the operator element for limiting a movement path of the operator element relative to the slat.

13. An air vent for a vehicle, having a slat according to claim 11.

14. An air vent for a vehicle, having an operator element according to claim 1.

15. An operator element for an air vent of a vehicle, wherein the operator element is slidably or rotatably mounted relative to a carrier element, and wherein the operator element is associated with a friction brake having an elastically deformable friction body, which elastically springingly pushes against the operator element and/or the carrier element, such that the friction brake moves the operator element relative to the carrier via friction,
wherein the friction body is aligned at least in regions in the longitudinal direction of the movement path of the operator element and has at least in regions a cross-section with an at least substantially star-shaped cross-sectional surface or a polygonal cross-sectional surface having at least three corners or a cross-sectional surface having circumferentially distributed tooth regions
wherein a bracket is associated with the friction body, wherein the bracket is associated with centering and/or positioning means, which are configured in order to cooperate with corresponding centering and/or positioning means of the friction body when the friction body is assembled in the bracket such that the friction body independently assumes a determined or determinable position and/or alignment relative to the bracket,
wherein the previously determined or determinable position and/or alignment of the friction body is selected such that, when the friction body is mounted in the bracket, at least one protruding region or tooth region of the friction body forms a frictional connection with a sliding surface extending in the direction of movement of the operator element, wherein the frictional force between the at least one protruding region or tooth region of the friction body and the sliding surface of the operator element is adjustable via a positioning or alignment of the friction body relative to the bracket and/or relative to the operator element and/or via a suitable spacing of the sliding surface relative to the friction body.

16. An operator element for an air vent of a vehicle, wherein the operator element is slidably or rotatably mounted relative to a carrier element, and wherein the operator element is associated with a friction brake having an elastically deformable friction body, which elastically springingly pushes against the operator element and/or the carrier element, such that the friction brake moves the operator element relative to the carrier via friction, wherein the friction body is aligned at least in regions in the longitudinal direction of the movement path of the operator element and has at least in regions a cross-section with an at least substantially star-shaped cross-sectional surface or a polygonal cross-sectional surface having at least three corners or a cross-sectional surface having circumferentially distributed tooth regions wherein a bracket is associated with the friction body, wherein the bracket is associated with centering and/or positioning means, which are configured in order to cooperate with corresponding centering and/or positioning means of the friction body when the friction body is assembled in the bracket such that the friction body independently assumes a determined or determinable position and/or alignment relative to the bracket, wherein the centering and/or positioning means associated with the bracket have at least one region protruding in the direction of the friction body in the form of a rib structure extending in the longitudinal direction of the friction body, wherein the at least one protruding region is formed in order to engage at least in regions in a recess of the friction body, which is formed to be complementary to the protruding region at least in regions, when the friction body is mounted, wherein the friction body has regions or tooth regions that are evenly distributed around its circumference and extend in the longitudinal direction of the friction body, wherein a gap is formed between two adjacent tooth regions in order to interact with the at least one region of the centering and/or positioning means associated with the bracket protruding towards the friction body when assembling the friction body, namely such that the centering and/or positioning means associated with the bracket allow the tooth regions of the friction body to move at least largely freely when clamping between the sliding surfaces of the operator element.

* * * * *